US 7,885,935 B2

(12) United States Patent
Kato et al.

(10) Patent No.: US 7,885,935 B2
(45) Date of Patent: Feb. 8, 2011

(54) PERIPHERAL DEVICE THAT MANAGES DATA DELETION AUTHORITY (75) Inventors: Masashi Kato, Nagoya (JP); Toru Tsuzuki, Okazaki (JP); Hiroyuki Yamamoto, Nagoya (JP); Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 431 days.

(21) Appl. No.: 11/693,866

(22) Filed: Mar. 30, 2007

(65) Prior Publication Data
US 2007/0233636 A1 Oct. 4, 2007

(30) Foreign Application Priority Data
Mar. 31, 2006 (JP) ............................. 2006-101255

(51) Int. Cl.
G06F 7/00 (2006.01)
G06F 17/00 (2006.01)

(52) U.S. Cl. ................. 707/661; 707/662; 707/663; 715/201; 715/209; 715/210

(58) Field of Classification Search ................. 726/9
See application file for complete search history.

(56) References Cited

U.S. PATENT DOCUMENTS

| 6,212,600 | B1* | 4/2001 | Friedman et al. ............. 711/112 |
| 6,731,447 | B2* | 5/2004 | Bunker et al. ................. 360/60 |
| 2002/0046286 | A1* | 4/2002 | Caldwell et al. ............. 709/229 |
| 2005/0213997 | A1 | 9/2005 | Yoshizawa |
| 2005/0257275 | A1 | 11/2005 | Ooba |
| 2006/0064441 | A1* | 3/2006 | Yamamoto ................. 707/201 |
| 2006/0074922 | A1* | 4/2006 | Nishimura ................. 707/100 |
| 2006/0155943 | A1* | 7/2006 | Todd et al. ................. 711/161 |

FOREIGN PATENT DOCUMENTS

| JP | H11-003264 A | 1/1999 |
| JP | H11-272562 A | 10/1999 |
| JP | 2001-350670 | 12/2001 |
| JP | 2002-169667 | 6/2002 |
| JP | 2003-162450 | 6/2003 |
| JP | 2004-128548 | 4/2004 |

(Continued)

OTHER PUBLICATIONS

"Advanced Security Performance" on Sharp Corporation's website <URL: http://www.sharp.co.jp/products/mx4501fn/text/security.html> search date: Mar. 23, 2006.

(Continued)

Primary Examiner—Mohammad Ali
Assistant Examiner—Angelica Ruiz
(74) Attorney, Agent, or Firm—Banner & Witcoff, Ltd (57) ABSTRACT A peripheral device has a mounting portion and a storage unit. The mounting portion is configured to mount a removable storage. The storage unit is configured to store data. The reading out unit reads out specific information from the removable storage medium when the removable storage medium is mounted to the mounting portion. The deletion unit deletes at least part of the data in the storage unit based on the specific information read out by the reading out unit.

20 Claims, 9 Drawing Sheets

FOREIGN PATENT DOCUMENTS

| | | |
|---|---|---|
| JP | 2004-272925 | 9/2004 |
| JP | 2004-343173 A | 12/2004 |
| JP | 2004-362237 | 12/2004 |
| JP | 2005-184545 A | 7/2005 |
| JP | 2005301212 | 10/2005 |
| JP | 2005-318208 | 11/2005 |
| JP | 2006-024078 | 1/2006 |

OTHER PUBLICATIONS

Office Action issued Apr. 6, 2010 in corresponding Japanese Patent Application No. 2006-101255, and English translation thereof.

Office Action in corresponding Japanese Patent Application No. 2006-101255 dated Aug. 24, 2010.

* cited by examiner

| USB MEMORY SERIAL NUMBER | USER ID | DELETION AUTHORITY | | |
|---|---|---|---|---|
| | | DELETION RANGE | DELETION METHOD | BACKUP |
| USB001 | ID001 | Level 1 | NORMAL | UNNECESSARY |
| USB002 | ID002 | Level 3 | DoD | NECESSARY |
| USB003 | ID003 | Level 2 | NATO | NECESSARY |
| ⋮ | ⋮ | ⋮ | ⋮ | ⋮ |

FIG.5

| DATE AND TIME | USER ID | CONTENTS OF PRINTING |
|---|---|---|
| MARCH 28, 2006, 19:00:21 | ID001 | XXX.doc |
| MARCH 28, 2006, 20:50:13 | ID003 | YYY.xls |
| ⋮ | ⋮ | ⋮ |

| FILE NAME | DELETE COMMAND |
|---|---|
| PersomalDelete.cmd | DELETION PERSONAL DATA (WITHOUT BACKUP) |
| PersomalDeleteSave.cmd | DELETION PERSONAL DATA (WITH BACKUP) |
| AllDelete.cmd | DELETION ALL DATA (WITHOUT BACKUP) |
| AllDeleteSave.cmd | DELETION ALL DATA (WITH BACKUP) |
| PhysicalDelete.cmd | DELETION PHYSICAL TRACE (WITHOUT BACKUP) |
| PhysicalDeleteSave.cmd | DELETION PHYSICAL TRACE (WITH BACKUP) |
| Destroy.cmd | PHYSICAL DESTRUCTION (WITHOUT BACKUP) |
| DestroySave.cmd | PHYSICAL DESTRUCTION (WITH BACKUP) |

| DELETION METHOD | CONTENTS |
|---|---|
| NORMAL | WRITE 00h |
| INTERMEDIATE | WRITE ffh AFTER 00h IS WRITTEN |
| DoD | COMPLY WITH THE STANDARD OF THE US DEPARTMENT OF DEFENSE |
| NATO | COMPLY WITH THE STANDARD OF NATO |

DELETION AUTHORITY SETTING
USB MEMORY SERIAL NUMBER  USB001
PLEASE SELECT THE DELETION RANGE

| Level 1 | Level 3 |
| Level 2 | Level 4 |

BACKUP  [NECESSARY]  [UNNECESSARY]

[OK]  [RETURN]

FIG.15

| LEVEL | DELETION RANGE |
| --- | --- |
| Level 1 | DELETION PERSONAL DATA |
| Level 2 | DELETION ALL DATA |
| Level 3 | DELETION PHYSICAL TRACE |
| Level 4 | PHYSICAL DESTRUCTION |

FIG.16

DELETION AUTHORITY SETTING
USB MEMORY SERIAL NUMBER  USB001
DELETION RANGE  Level 1  [NECESSARY]

PLEASE SELECT THE DELETION METHOD

| NORMAL | DoD |
| INTERMEDIATE | NATO |

[OK]  [RETURN]

FIG.17

PERIPHERAL DEVICE THAT MANAGES DATA DELETION AUTHORITY

CROSS REFERENCE TO RELATED APPLICATIONS

This application claims priority from Japanese Patent Application No. 2006-101255 filed Mar. 31, 2006. The entire content of the priority application is incorporated herein by reference.

TECHNICAL FIELD

The present invention relates to a peripheral device and a method for managing a data deletion authority. More particularly, the present invention relates to a peripheral device including an interface to which a removable storage medium can be connected, and a method for managing a data deletion authority.

BACKGROUND

A printing device authenticates the user by using an operating panel and an IC (Integrated Circuit) card, and restricts functions including a function of deleting data. To be authenticated, the user with the IC card inputs a password and E-mail address by using the operating panel. One such device is disclosed in a document on the web (URL: http://www.sharp-.co.jp/products/mx4501fn/text/security.html), Sharp Corporation. The published date of this document is unknown. However, the inventors of this application were familiar with this document at the time of Mar. 23, 2006.

In addition, an image forming device, disclosed in U.S. Patent Application Publication No. 2005/213997 A1 (corresponding to Japanese Patent Application Publication No. 2005-301212) communicates with an IC tag mounted in a consumable part, and determines whether the consumable part mounting the IC tag can be used based on information obtained from the IC tag by the communication. If the consumable part cannot be used, the image forming device restricts the user from accessing information stored in a storage area of the IC tag mounted in the consumable part.

SUMMARY

Aspects of the present invention relate to a peripheral device and a method for managing a deletion authority of data with mounting and removing removable storage medium but without inputting operation of a password, to achieve improved usability.

In another aspect, the present invention provides a peripheral device and a method for managing a deletion authority of data, in which a deletion authority of data can be changed depending on a removable storage medium that a user has.

In still another aspect, the present invention provides a peripheral device, a method for managing a deletion authority of data, and a program, in which data and a trace of data left undeleted in the peripheral device can be physically deleted, based on a deletion authority of data.

In still another aspect, the invention provides a peripheral device. The peripheral device includes a mounting portion, a storage unit, a reading out unit, a deletion unit. The mounting portion is configured to mount a removable storage. The storage unit is configured to store data. The reading out unit reads out specific information from the removable storage medium when the removable storage medium is mounted to the mounting portion. The deletion unit deletes at least part of the data in the storage unit based on the specific information read out by the reading out unit.

In still another aspect, the invention provides a peripheral device. The peripheral device includes a mounting portion, a storage unit, a reading out unit, a deletion authority specifying unit, and a permitting unit. The mounting portion is configured to mount a removable storage. The storage unit is configured to store data. The reading out unit reads out specific information from the removable storage medium when the removable storage medium is mounted. The deletion authority specifying unit specifies a deletion authority for specifying authority to delete data based on the specific information read out by the reading out unit. The permitting unit permits deletion of data in the storage unit based on the deletion authority specified by the deletion authority specifying unit.

In still another aspect, the invention provides a method for managing deletion of data in a peripheral device which includes a mounting portion that is configured to mount a removable storage medium and a storage unit that is configured to store data. The method includes reading out specific information from the removal storage medium when the removable storage medium is mounted to the mounting portion and deleting at least part of the data in the storage unit based on the specific information read out from the removable storage medium.

In still another aspect, the invention provides a method for managing deletion of data in a peripheral device which includes a mounting portion that is configured to mount a removable storage medium and a storage unit that is configured to store data. The method includes reading out specific information from the removable storage medium when the removable storage medium is mounted to the mounting unit, specifying a deletion authority for specifying authority to delete data based on the specific information read out from the removable storage medium, and permitting deletion of data in the storage unit based on the specified deletion authority.

BRIEF DESCRIPTION OF THE DRAWINGS

Illustrative aspects in accordance with the invention will be described in detail with reference to the following figures wherein.

DETAILED DESCRIPTION

A peripheral device and a method for managing a data deletion authority according to some aspects of the invention will be described while referring to the accompanying drawings wherein like parts and components are designated by the same reference numerals to avoid duplicating description.

Figure 1:
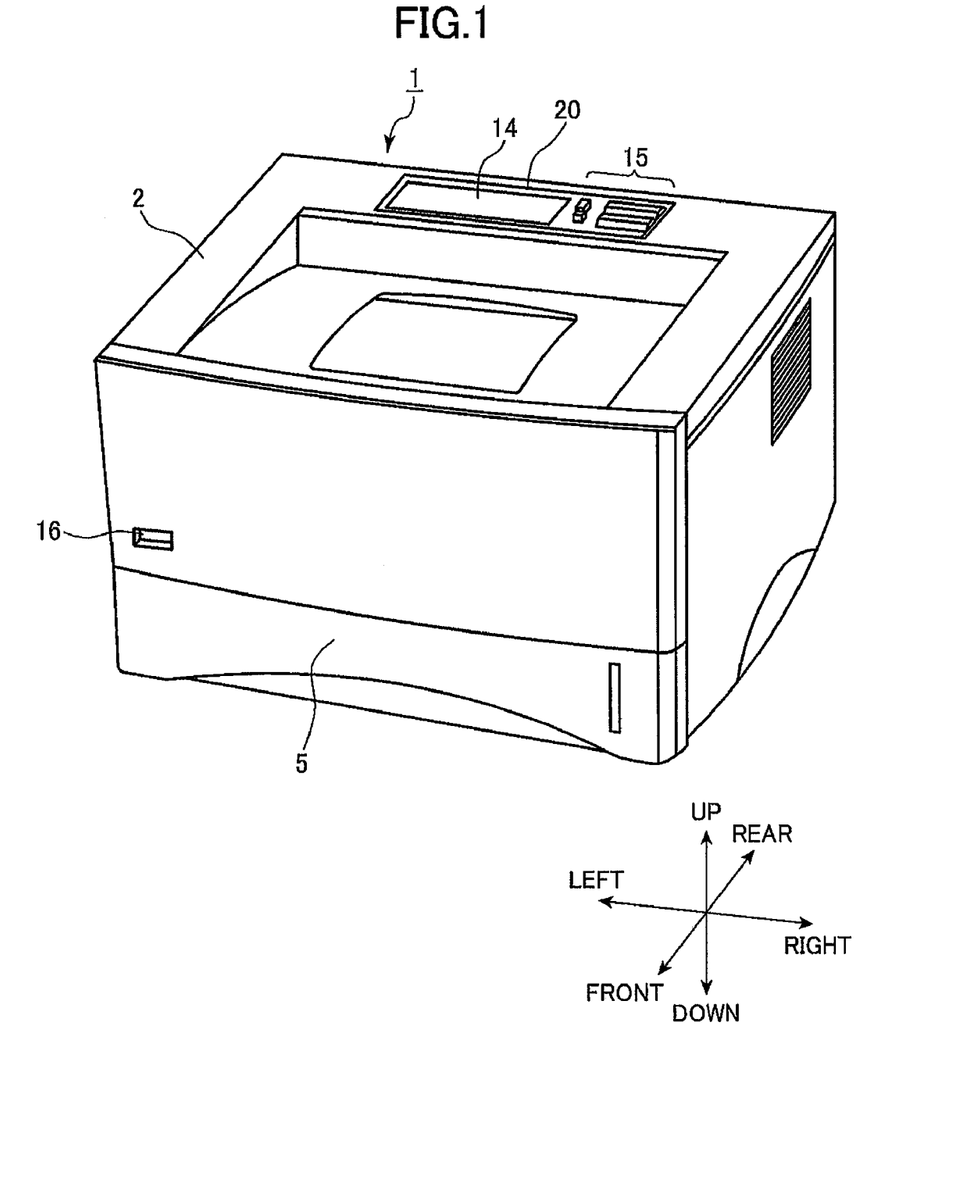
FIG. 1 is a perspective view of an external appearance of a printing device according to an embodiment of the present invention.

FIG. 1 is a perspective view showing an external view of a printing device 1 which is a peripheral device according to an embodiment of the present invention. In the following description, the expressions "front", "rear", "upper", "lower", "right", and "left" are used to define the various parts when the printing device 1 is disposed in an orientation in which it is intended to be used. In use, the printing device 1 is disposed as shown in FIG. 1.

The printing device 1 includes a housing 2 and a paper feed tray 5. The paper feed tray 5 is disposed on the lower part of the housing 2. The paper feed tray 5 contains a stack of sheets of paper. The paper feed tray 5 can be mounted on the housing 2, and can be removed from the housing 2 by being pulled out to the front direction of the printing device 1.

Figure 2:
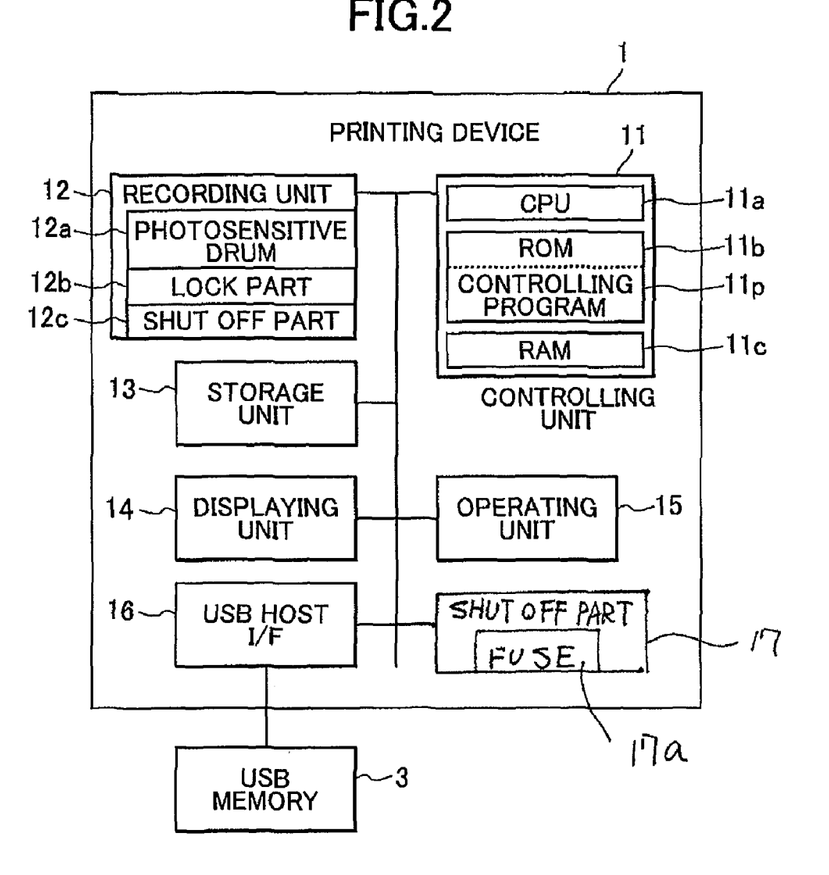
FIG. 2 is a block diagram of the printing device.

The printing device 1 includes an operating panel 20 and a USB (Universal Serial Bus) host I/F (interface) 16. The operating panel 20 is disposed on the rear edge on the top surface of the printing device 1. The operating panel 20 includes a displaying unit 14 and an operating unit 15. The USB host I/F 16 is provided on a front surface of the printing device 1. As shown in FIG. 2, a USB memory 3, as a removable storage medium, is detachably installed (mounted) to the USB host I/F 16. The USB memory 3 has a serial number (identification data) that identifies the USB memory 3. The printing device 1 reads the serial number of the USB memory 3 when the USB memory 3 is mounted to the USB host I/F 16.

FIG. 2 is a circuit block diagram of the printing device 1. The printing device 1 includes a control unit 11, a recording unit 12, a storage unit 13, the displaying unit 14, the operating unit 15, the USB host I/F 16 and a shut off part 17. The control unit 11 includes a CPU (Central Processing Unit) 11a, a ROM (Read Only Memory) 11b, a RAM (Random Access Memory) 11c, and peripheral circuits thereof. The recording unit 12 includes a photosensitive drum 12a, a lock part 12b, a shut off part 12c, a laser-beam system (not shown) and an ink-jet system (not shown). The lock part 12b mechanically locks the rotation of the photosensitive drum 12a. The shut off part 12c cuts out an electric power supply. The storage unit 13 is, for example, a hard disc drive (HDD). The displaying unit 14 includes a liquid-crystal display. The operating unit 15 includes a variety of operating buttons. The ROM 11b stores a control program 11p. The CPU 11a executes the control program 11p and therefore the printing device 1 carries out a variety of operations. The shut off part 17 includes a fuse 17a. The shut off part 17 shuts off the power supply of the printing device 1 by blowing up the fuse 17a. The recording unit 12 may includes a photosensitive belt instead of the photosensitive drum 12a.

Figure 3:
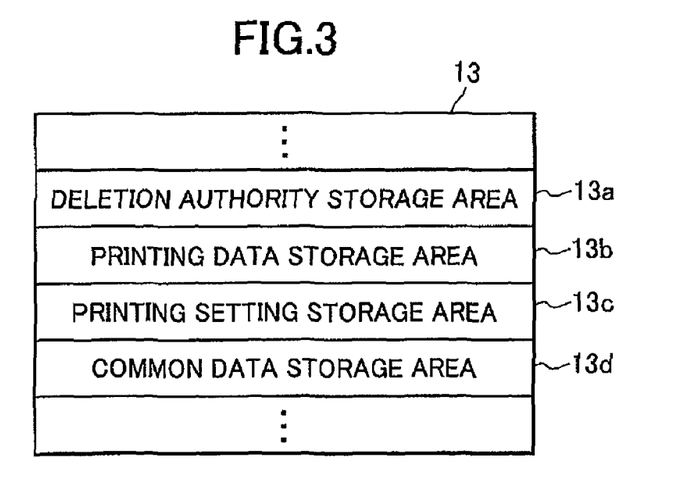
FIG. 3 is an explanatory diagram showing details of a storage unit.

FIG. 3 shows a detail of the storage unit 13. The storage unit 13 includes a deletion authority storage area 13a, a printing data storage area 13b, a printing setting storage area 13c, and a common data storage area 13d. The deletion authority storage area 13a stores a deletion authority management table shown in FIG. 4 (details thereof will be described later).

Figure 5:
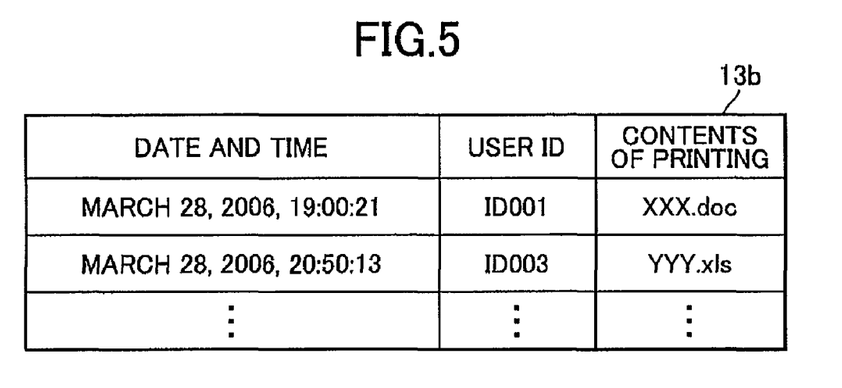
FIG. 5 is a table showing a configuration example of a printing data storage area.

FIG. 5 shows an example of a configuration of the printing data storage area 13b. The printing data storage area 13b stores data of the date and time of printing, a user ID of the user who carries out printing, and printed contents including the name of a printed file. The printing data storage area 13b may include a printing JOB number which is a serial number for each time of printing.

The printing setting storage area 13c includes printing parameters necessary for printing. The printing parameters include a size of paper for printing, a direction of paper, a rate of enlargement or reduction in size, and a number of sheets of paper to be printed. The printing setting storage area 13c stores printing parameters for the printing carried out immediately before, or printing parameters for each user. The common data storage area 13d stores data including a printing template which is set in the printing device 1 regardless of users.

Figure 6:
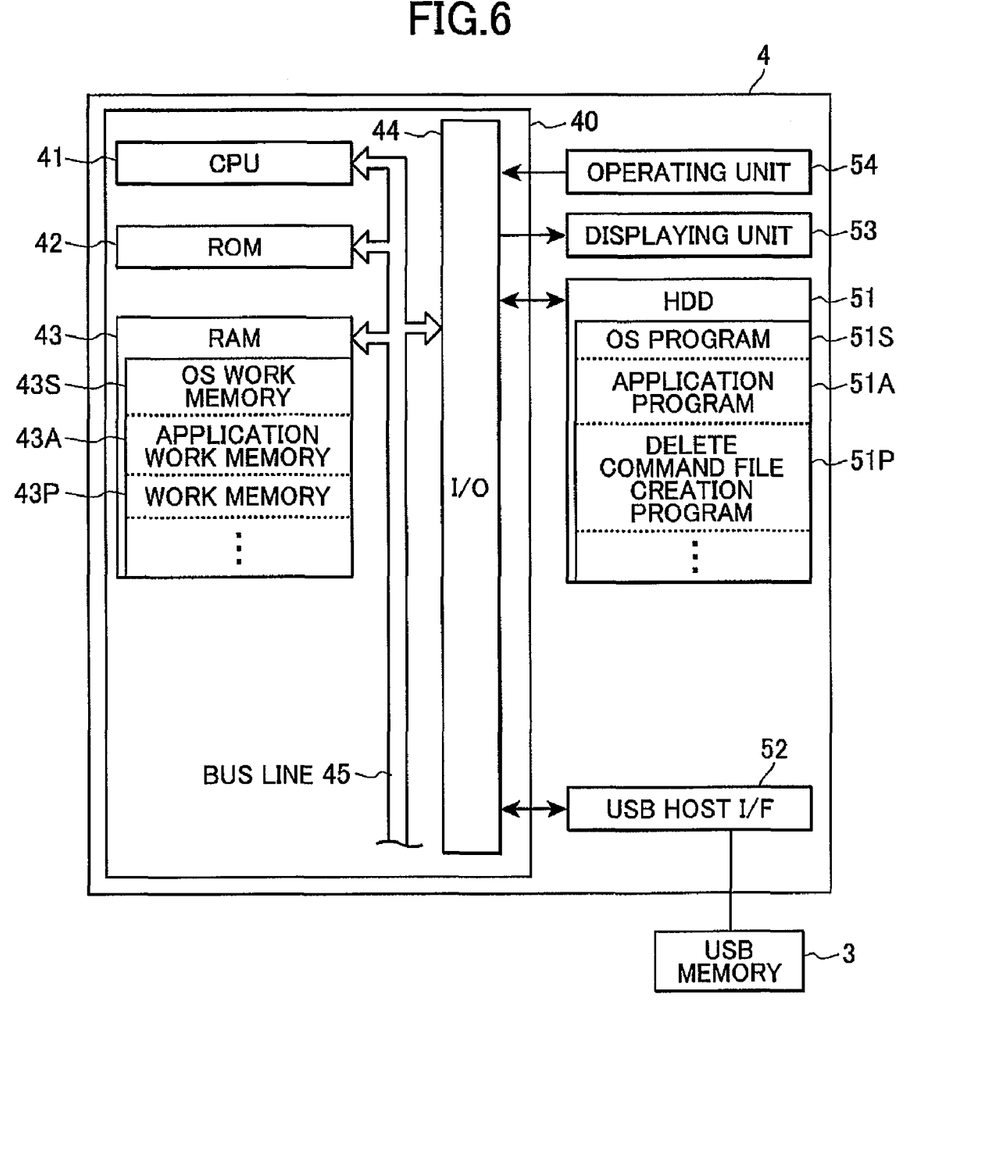
FIG. 6 is a block diagram showing a configuration of a personal computer for creating a delete command file.

FIG. 6 shows an example of a configuration of a personal computer (hereinafter, abbreviated merely as PC) 4 used for generating a delete command file. The PC 4 is configured as a well-known personal computer, and includes an HDD (abbreviated as HDD in FIG. 1) 51, a USB host I/F 52, a displaying unit 53, an operating unit 54, and a controlling circuit 40. The controlling circuit 40 is connected to the HDD 51, the USB host I/F 52, the displaying unit 53, and the operating unit 54. The USB memory 3 can be detachably inserted into the USB host I/F 52.

The HDD 51 stores an OS program 51S, an application program 51A, a delete command file creating program 51P, and other data necessary for operation of each program. The OS program 51S functions as an operating system (OS) which operates the PC 4. The application program 51A operates on the OS. The delete command file creating program 51P operates on the OS in a similar manner.

The displaying unit 53 includes a displaying device such as a liquid crystal display and a CRT display. The operating unit 54 includes an operating means including a pointing device such as a mouse and a keyboard.

A controlling circuit 40 includes a CPU 41, a ROM 42, a RAM 43, an input/output interface (I/O) 44, and a bus line 45. The bus line 45 is connected to the CPU 41, the ROM 42, the RAM 43, and the I/O interface 44. The RAM 43 includes an OS work memory 43S, an application work memory 43A, and a work memory 43P. The CPU 41 controls the PC 4 based on the OS program 51S stored in the HDD 51. The OS program 51S is executed in the OS work memory 43S as a working area on the RAM 43. In addition, the application program 51A and the delete command file creating program 51P are executed in the application work memory 43A and the work memory 43P as a working area, respectively.

A set of processes concerning deleting data in the present embodiment will be described. In summary, first, in a delete command file creating process, a delete command file is created and transferred to the USB memory 3 that is inserted to the PC 4. Second, a deletion authority for the user of the USB memory 3 is set in the printing device 1 in a data delete setting process. When the USB memory 3 is inserted to the printing device 1, the printing device 1 inquires the deletion authority of the command file in the USB memory 3.

The delete command file creating process on the PC 4 will be described in detail by using FIG. 7. The process is included in the delete command file creating program 51P, and repeatedly executed together with other programs including the application program 51A on the OS. First, when the USB memory 3 is inserted into the USB host I/F 42, insert information showing insertion of the USB memory into the USB host I/F 42 is sent to the controlling circuit 40 from the USB host I/F 42 (S201). Next, as shown in FIG. 8, a deletion authority setting screen including a USB memory serial number for identifying the USB memory 3 is displayed on the display of the displaying unit 53. In S202, the user sets a level of a deletion range of the deletion authority on the deletion authority setting screen, and sets whether a backup is necessary or not by clicking a necessary button or an unnecessary button on the deletion authority screen.

Figure 9:
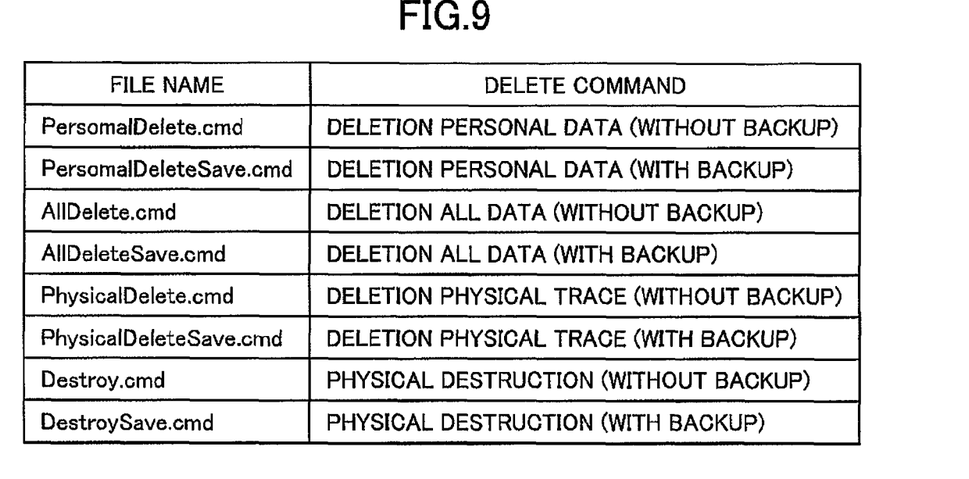
FIG. 9 is a table showing an example of a relationship between a delete command filename and a delete command.

FIG. 9 shows an example of a relationship between a delete command filename and a delete command. As will be described hereinafter, contents of the delete command are shown by the delete command filename.

(1) "PersonalDelete.cmd" shows a personal data delete command (without backup) and "PersonalDeleteSave.cmd" shows a personal data delete command (with backup). These are the delete command with the deletion range being Level 1.

(2) "AllDelete.cmd" shows an all data delete command (without backup) and "AllDeleteSave.cmd" shows an all data delete command (with backup). These are the delete command with the deletion range being Level 2.

(3) "PhysicalDelete.cmd" shows a physical trace delete command (without backup) and "PhysicalDeleteSave.cmd" shows a physical trace delete command (with backup). These are the delete command with the deletion range being Level 3.

(4) "Destroy.cmd" shows a physical destruction command (without backup) and "DestroySave.cmd" shows a physical destruction command (with backup). These are the delete command with the deletion range being Level 4.

In the present embodiment, the delete commands are classified into a delete command with backup and a delete command without backup. If the user selects the delete command with backup, the data to be deleted is can be backed up in the USB memory 3, in case deleted data becomes necessary.

For example, if the user selects the "Level 1" button and the "necessary" button and clicks the "OK" button on the display shown in FIG. 8, the delete command filename is "PersonalDeleteSave.cmd" (personal data erasing, with backup). The contents of the setting are retained in the work memory 43P.

Figure 10:
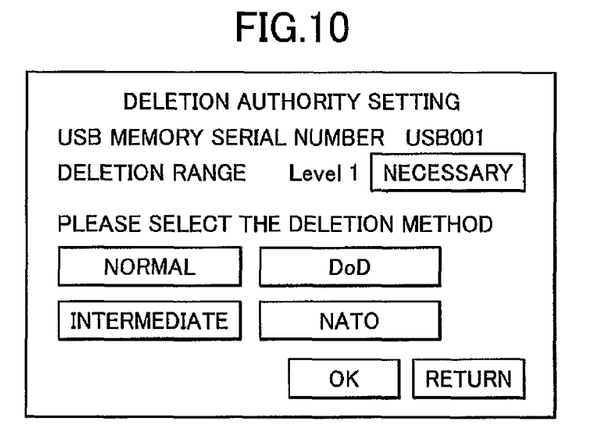
FIG. 10 is a screen shot showing an example of a display at the time of creating a delete command file after FIG. 8.
Figure 11:
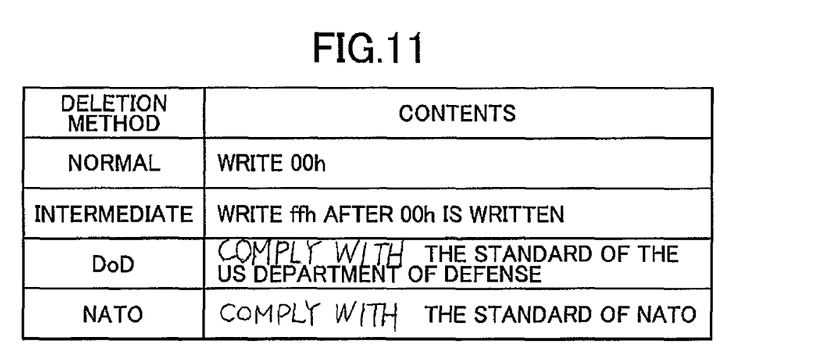
FIG. 11 is a table showing an example of a deletion method stored in the deletion authority storage unit.

Next, a screen shown in FIG. 10 is displayed, and the user sets a deletion method within the deletion range set above as the deletion authority (S203). The deletion method is defined, for example, as shown in FIG. 11.

(i) Normal—For example, data such as 00h (h: hexadecimal number) is written in the deletion range once (data is written once in total).

(ii) Intermediate—For example, 00h is written in the deletion range once and ffh is written in the deletion range once (data is written twice in total).

(iii) DoD—This method complies with the standard of the US Department of Defense (DoD). For example, data is written in the deletion range in the order of 00h—ffh—designated data (512 byte) (data is written three times in total).

(iv) NATO—This method complies with the standard of NATO (the North Atlantic Treaty Organization). Data is written in the deletion range in the order of 00h—ffh—00h—ffh—00h—ffh—designated data (512 byte) (data is written seven times in total).

The set contents are retained in the work memory 43P. That is, the set contents are stored in the delete command file. In addition, a security level is highest in the method (iv), and is lower and lower in the order of the methods (iii), (ii), and (i).

Finally, the set contents retained in the work memory 43P are sent to the USB memory 3 (S204). That is, the delete command file is transferred and stored in the USB memory 3. The deletion method is stored in the delete command file.

A combination of the deletion range and the deletion method of the deletion authority may be decided at the user's own discretion without any particular limitation.

The deletion authority may include only the deletion range. In this case, a process of step S203 is skipped in the flowchart of FIG. 7. In addition, in this case, the delete command file to be created may be an empty file only having the filename.

Figure 12:
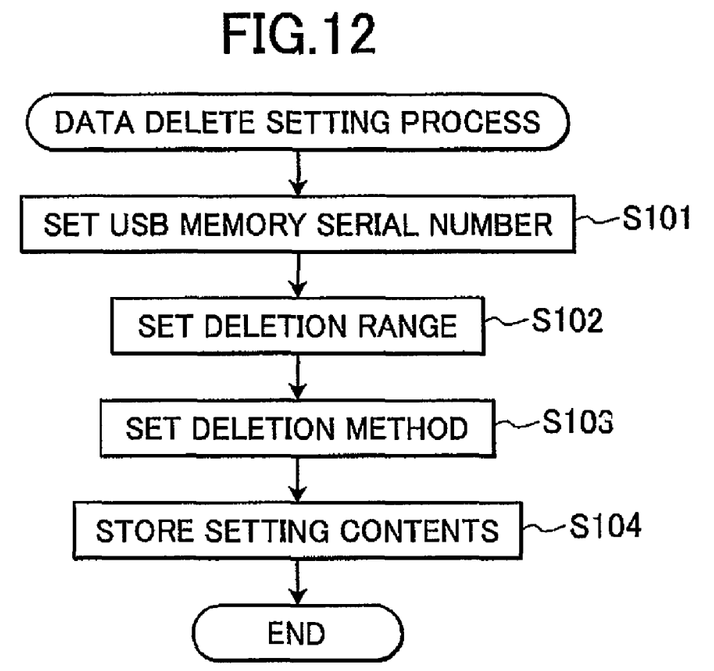
FIG. 12 is a flowchart showing a data delete setting process in the printing device.
Figure 13:
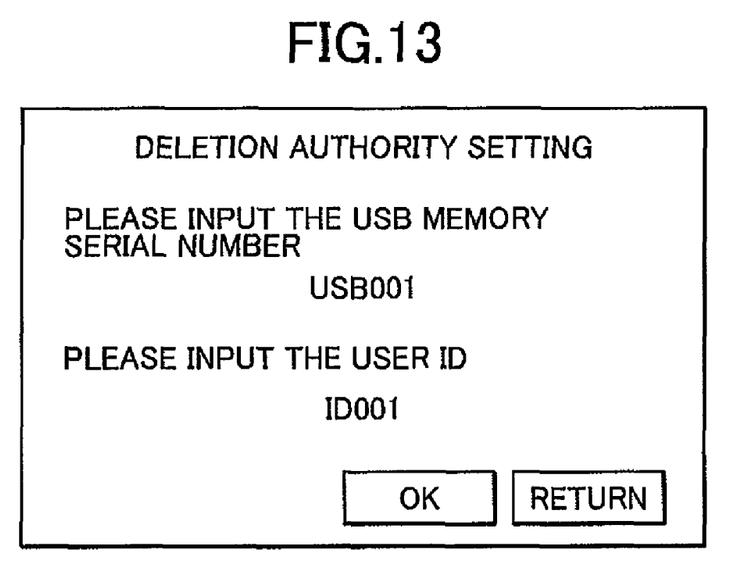
FIG. 13 is a screen shot showing an example of a display at the time of executing the data delete setting process.

The data delete setting process in the printing device 1 is explained by using FIG. 12. The data delete setting process is included in the control program 11p and executed repeatedly together with other processes in the control program 11p. First, the operating unit 15 is operated to display a data delete setting screen shown in FIG. 13 on the displaying unit 14. In S101, in accordance with the guidance on the screen, the user sets the USB memory serial number. At this time, when the user ID or the volume label is stored in the USB memory 3, the user ID may be set as well. Or, the user ID or the volume label may be set instead of the USB memory serial number.

Figure 14:
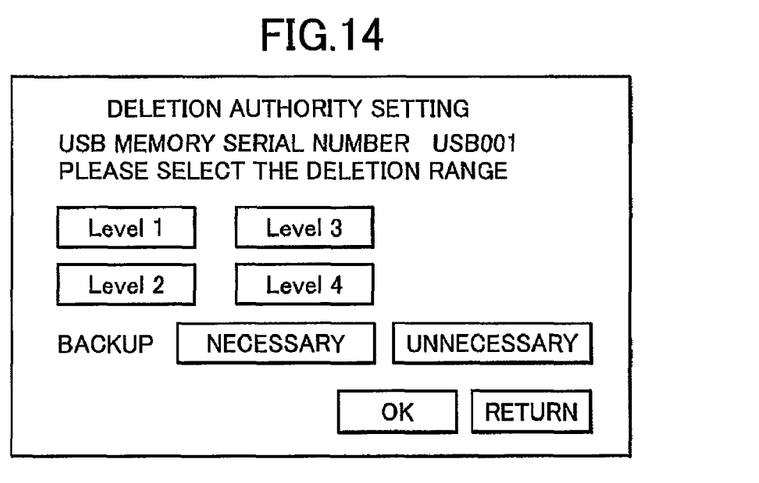
FIG. 14 is a screen shot showing an example of a display at the time of executing the data delete setting process after FIG. 13.
Figure 15:
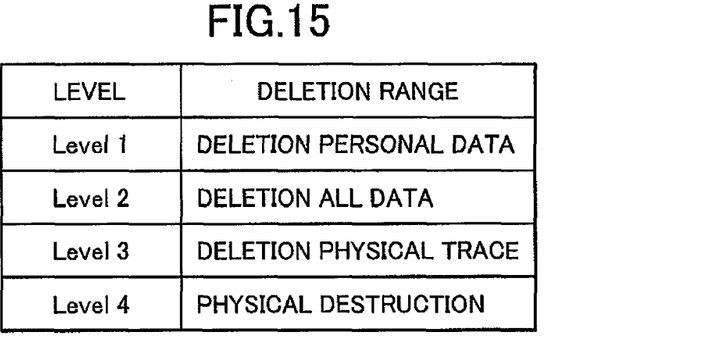
FIG. 15 is a table showing an example of an deletion range level stored in a deletion authority storage unit.

When the user inputs the USB serial number and presses "OK" button, a screen of setting a level of the deletion range as shown in FIG. 14 is displayed. Then, in S102, the user sets a level. This level is same as the level of the deletion range of the deletion authority in the delete command file creating process carried out in the PC 4 described above. As shown in FIG. 15, Level 1 is the authority to delete only personal data, Level 2 is the authority to delete all data in the designated area of the storing unit 13, Level 3 is the authority to physically erase a trace of data in the storage, for example a photosensitive drum 12 (or a photosensitive belt) in the recording unit 12, and Level 4 is the authority to physically destroy the storage. The level with a larger number is a higher level, and the user having the deletion authority of a higher level can execute the deleting of a lower level as well. Data necessary for setting the level is stored in the deletion authority storage area 13a.

Figure 16:
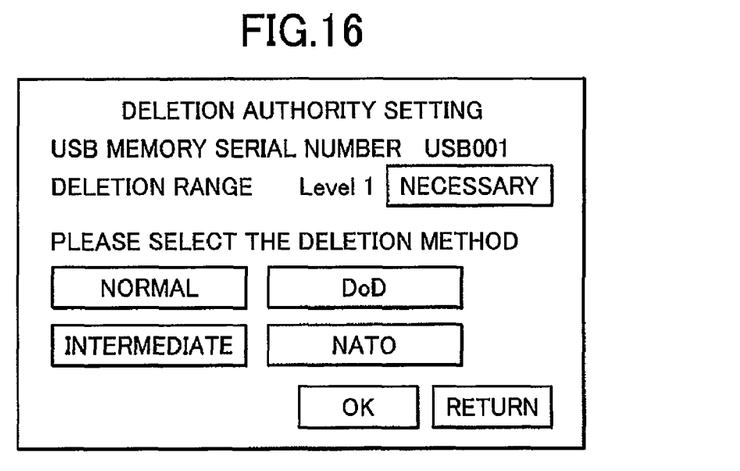
FIG. 16 is a screen shot showing an example of a display at the time of executing the data delete setting process after FIG. 14.

When the user selects a level of the deletion range and clicks "OK" button on the screen shown in FIG. 14, a screen of setting the deletion method as shown in FIG. 16 is displayed. Then, the user sets the deletion method (S103). The deletion method is as shown in FIG. 11 described above, and data necessary for setting the deletion method is stored in the deletion authority storage area 13a.

Figure 4:
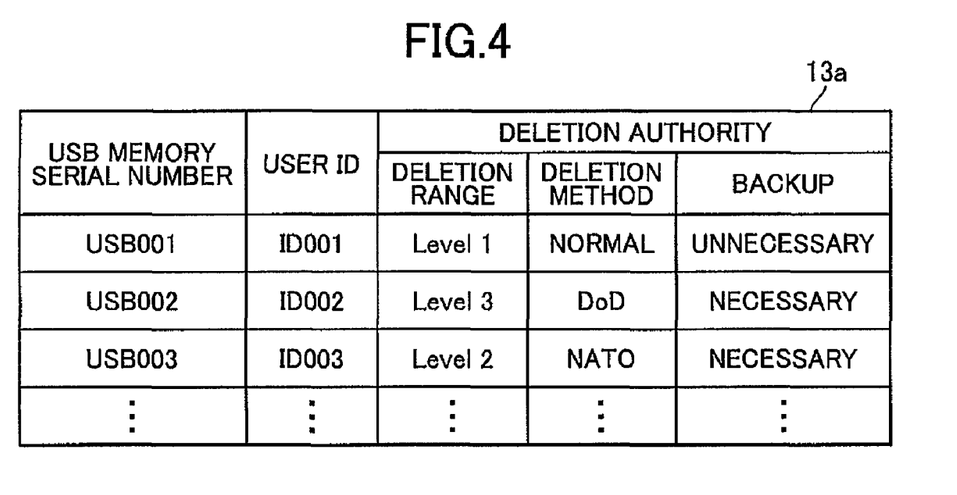
FIG. 4 is a table showing a configuration example of a deletion authority management table.

In S104, when the user sets the deletion method and clicks the "OK" button, the above-set contents are stored in a free space of the deletion authority management table. FIG. 4 shows an example of the configuration of the deletion authority management table. The deletion authority management table stores the USB memory serial number for identifying the USB memory 3, the user ID for identifying the user using the USB memory 3, the level of the deletion range in the deletion authority, the deletion method of the deletion authority and information to determine whether back up data is necessary. In addition, the deletion authority management table may include the volume label.

Figure 17:
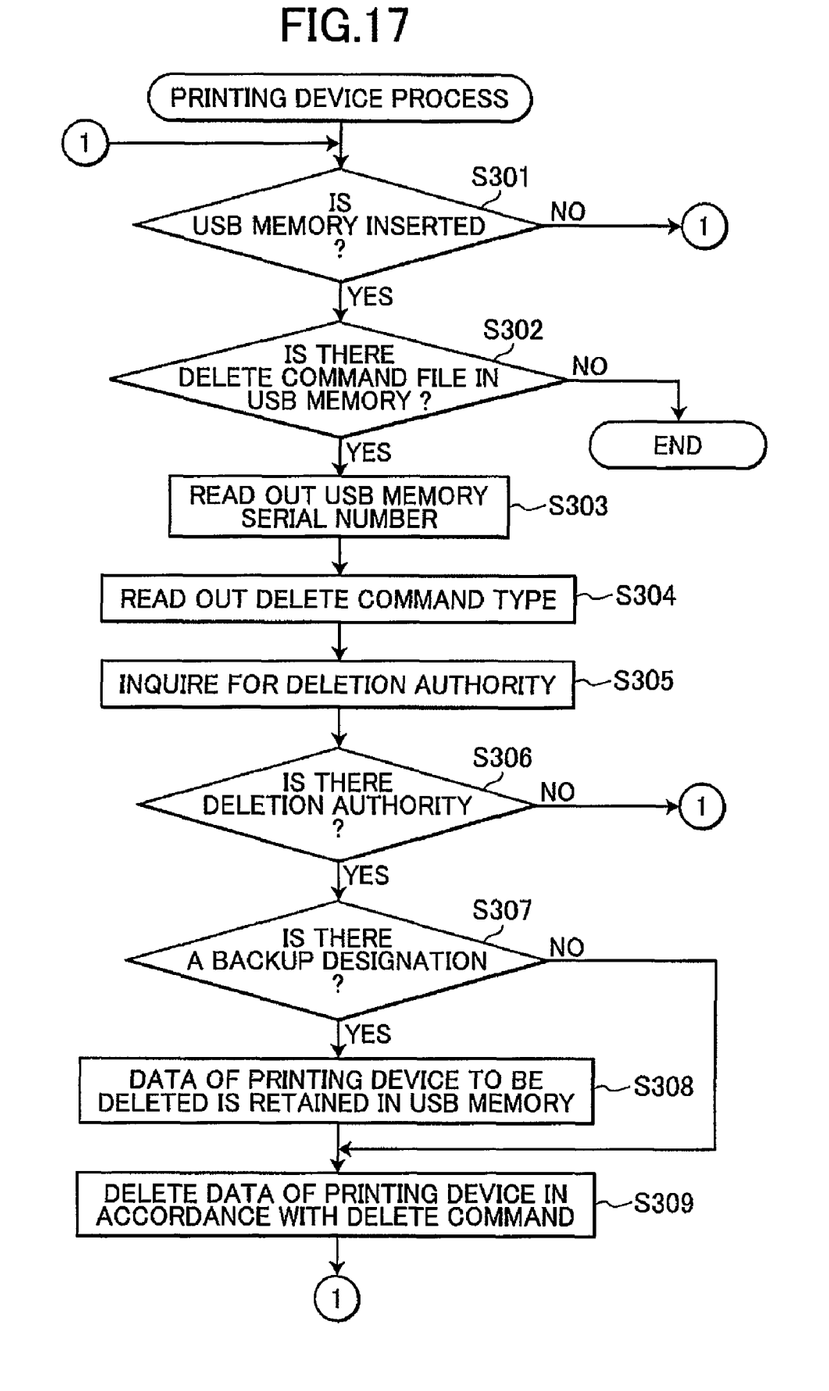
FIG. 17 is a flowchart showing a printing device process in the printing device.

A printing device process of the printing device 1 is explained by using FIG. 17. The printing device process is included in the controlling program 11p and repeatedly executed together with other processes included in the controlling program 11p. First, the controlling unit 11 determines whether the USB memory 3 is inserted into the USB host I/F 16. If the USB memory 3 is not inserted into the USB host I/F 16 (S301: NO), the controlling unit 11 waits until the USB memory 3 is inserted into the USB host I/F 16.

On the other hand, if the USB memory 3 is inserted into the USB host I/F 16 (S301: YES), in S302, the controlling unit 11 reads out storage contents of the USB memory 3 to the RAM 11c to determine whether any unprocessed delete command file is included in the storage contents. To explain more particularly, the file read out from the USB memory 3 determines whether, for example, there is any unprocessed file included in the delete command file table which is stored in the deletion authority storage area 13a and has a similar configuration as the configuration shown in FIG. 5. If no unprocessed file is included in the delete command file table (S302: NO), the printing device process ends.

If the delete command file is included in the file read out from the USB memory 3 (S302: YES), the controlling unit 11 reads out the serial number (S303) and the deletion authority of the USB memory 3 (S304) and carries out an inquiry for the deletion authority (S305). More specifically, the controlling unit 11 searches for the deletion authority management table retained in the deletion authority storage area 13a by using the USB memory serial number as a key, and checks whether the USB memory serial number is registered. If the USB memory serial number is registered, the controlling unit 11 checks a level of the deletion authority corresponding to the USB memory serial Number.

If the user ID or the volume label is stored in the USB memory 3, the controlling unit 11 may refer to the user ID or the volume label stored corresponding to the USB memory serial number of the deletion authority management table. Thereby, the controlling unit 11 determines whether both of the user IDs match with each other. Only when both of the user IDs match with each other, the controlling unit 11 proceeds to the next step (S304). If the user IDs do not match with each other, the process returns to step S301.

Next, the controlling unit 11 determines whether the user having the USB memory 3 has the deletion authority of data based on a result of the inquiry for the deletion authority (S306). To explain more specifically, the controlling unit 11 compares the level of the deletion authority, which is checked in S305, corresponding to the USB memory serial number with the level of the deletion authority of the delete command shown by the delete command file. That is, the controlling unit 11 determines whether the level of the deletion authority, which is checked in S305, corresponding to the USB memory serial number is equal to or higher than the level of the deletion authority of the delete command shown by the delete command file. Thereby, the controlling unit 11 determines whether the user has the deletion authority of data. If the user having the USB memory 3 does not have the deletion authority of data (S306: NO), that is, the level of the deletion authority (which is checked in S305) corresponding to the USB memory serial number is lower than the level of the deletion authority of the delete command shown by the delete command file, the controlling unit 11 returns to S301.

In a case where the deletion method is stored in the delete command file read out from the USB memory 3, in S306, the controlling unit 11 may check whether the deletion method is within the deletion authority as well as whether the user has the deletion authority of data. That is, the controlling unit 11 compares the deletion method read out from the USB memory 3 with the deletion method corresponding to the USB memory serial number of the deletion authority management table. Then, if the deletion method read out from the USB memory 3 has a security degree equal to or higher than the deletion method corresponding to the USB memory serial number of the deletion authority management table, the controlling unit 11 determines that the user has the deletion authority.

If the user having the USB memory 3 has the deletion authority of data (S306: YES), that is, the level of the deletion authority, which is checked in S305, corresponding to the USB memory serial number is equal to or higher than the level of the deletion authority of the delete command shown by the delete command file, the controlling unit 11 determines whether the delete command has a backup designation (S307). More specifically, the controlling unit 11 determines whether there is a letter string "Save" at the end of the delete command filename except the extension ".cmd". This is done by using a letter-string comparison method in well-known text data. At this time, if the delete command filename read out from the USB memory 3 does not match with the corresponding delete command filename in the deletion authority management table, the controlling unit 11 may return to step S301.

If there is the backup designation in the delete command (S307: YES), that is, there is a letter string "Save" at the end of the delete command filename except the extension ".cmd", in S308, data of the printing device 1 to be deleted by the delete command is retained in a predetermined area of the USB memory 3. If there is no backup designation (S307: No), that is, there is no letter string "Save" at the end of the delete command filename except the extension ".cmd", the controlling unit 11 skips S308.

Finally, the delete command is executed to delete the corresponding data from the printing device 1 (S309), and the controlling unit 11 returns to step S301.

Hereinafter, details of the level of the deletion authority and the data deletion will be described.

(1) In a case where the level of the deletion authority is Level 1

Only printing data corresponding to the user ID in the printing data storage area 13b or the printing setting storage area 13c is erased.

(2) In a case where the level of the deletion authority is Level 2

All data in the printing data storage area 13b, the printing setting storage area 13c, and the common data storage area 13d is erased.

(3) In a case where the level of the deletion authority is Level 3

All electronic data and the physical trace of printing (a trace of printing data left undeleted on the photosensitive drum 12a (or the photosensitive belt) of the recording unit 12 (so called "ghost"), or a trace of data in the storage unit 13) are deleted. For example, as a method for deleting them, there is a method of printing a printable range of printing paper with "all black" for the predetermined number of sheets of paper.

(4) In a case where the level of the deletion authority is Level 4

In order to completely prohibit data from being taking out from the printing device 1, all electronic data and the physical trace of printing are deleted, and further, the printing device 1 (including the photosensitive drum, the photosensitive belt of the recording unit 12, and the storage unit 13) is physically disabled (destroyed) such that printing cannot be carried out. For example, the lock part 12b mechanically locks a rotation of the photosensitive drum included in the recording unit 12, or the shut off part 17 shut off an electric power supply by blowing out the fuse 17a.

According to the embodiment descried above, when the USB memory 3 storing the command file is inserted into the USB host I/F 16, the controlling unit 11 refers to the deletion authority management table that shows the relation between the level of the deletion authority and the USB memory serial number and that is registered in the printing device 1 in advance. The controlling unit 11 determines whether the user of the USB memory 3 has the deletion authority. If the user has the deletion authority of data, the data can be deleted by executing the delete command in the delete command file. Therefore, the user is not required to input a password for deleting the data, and the user may only need to insert the USB memory 3 into the USB host I/F 16. Accordingly, the operability is significantly improved.

In addition, the deletion authority management table showing the relation between the level of the deletion authority and the USB memory serial number registered in the printing device 1 in advance. Therefore, by rewriting the deletion authority management table, the deletion authority of data can be changed depending on the USB memory 3 that the user has.

Further, by executing the delete command of the deletion authority of Level 3 and Level 4, even the trace of data left undeleted in the printing device 1 can be physically deleted. Thereby, the printing device 1 may have an advanced information security.

According to the printing device 1 described above, data in the printing device 1 can be deleted based on the delete command file read out from the USB memory 3. Since a means for deleting data other than this method is not provided, only the user having the USB memory 3.

Since data of the printing device 1 permits to be deleted based on a deletion authority of data, a function of deleting data can be controlled depending on the user's deletion authority of data.

Since a physical trace of data stored in the printing device 1 can be deleted. Therefore, data does not leak from the printing device 1.

Further, the deleting operation can be carried out depending on the level of the deletion authority of data.

Since data can be partially or completely deleted depending on the level. Therefore, the printing device 1 can manage the user authorized for the partial deletion and the user authorized for the complete deletion.

The deletion authority of data is classified into four levels. Therefore, the deletion authority of data can be managed in detail.

Since data to be deleted is backed up to the USB memory 3, the user can prepare a case where deleted data becomes necessary.

While the invention has been described in detail with reference to the above embodiments thereof, it would be apparent to those skilled in the art that various changes and modifications may be made therein without departing from the spirit of the invention.

Figure 7:
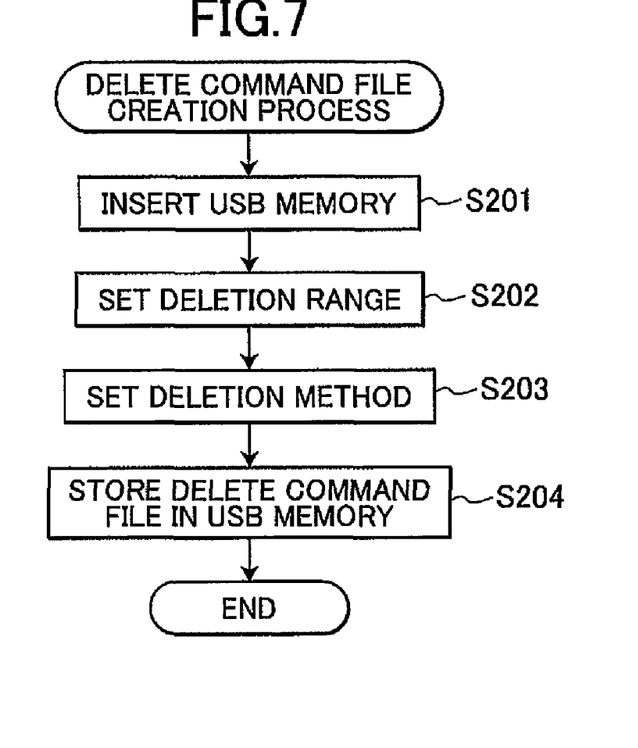
FIG. 7 is a flowchart showing a delete command file creation process in the personal computer for creating a delete command file.
Figure 8:
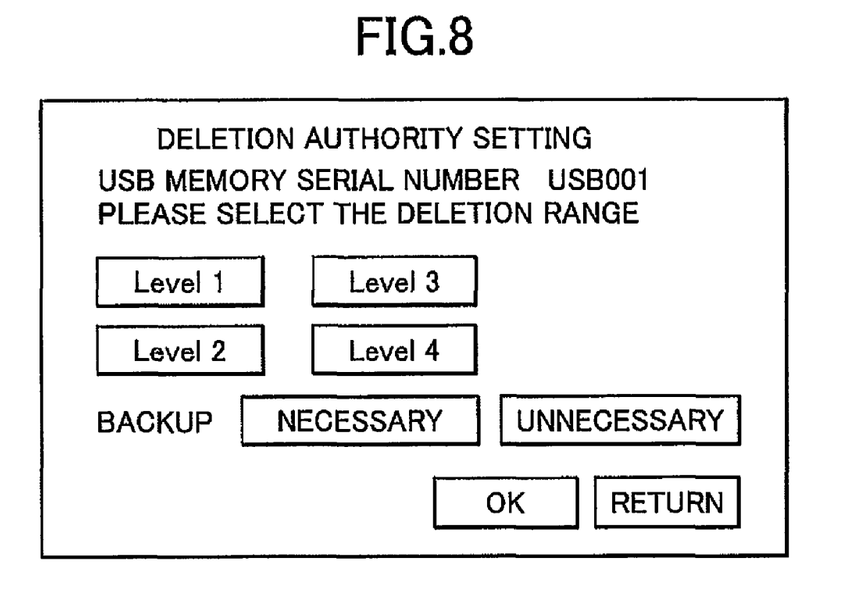
FIG. 8 is a screen shot showing an example of a display at the time of creating a delete command file.

In S202 of the deletion command file creating process in FIG. 7 described above, the user sets level of a deletion range and whether a back up is necessary on the setting screen shown in FIG. 8. The user ID identifying the user using the USB memory 3 may be input on the setting screen as FIG. 8 and may be stored in the USB memory 3. In this manner, an authentication of the user can be carried out more precisely. In this case, the user ID is stored in the delete command file. In addition, a volume label of the USB memory 3 may be set.

The setting of the delete command described above in the delete command file creating process is executed in the PC4. However the setting of the delete command and creating the delete command file in the USB memory 3 may be executable in the printing device 1. In this case, such program is included in the control program 11*p*, and setting of the delete command is carried out by operating the operating unit 15 in accordance with what is displayed on the displaying unit 14.

In the embodiment described above, the printing device 1 is described as an example of the peripheral device. However, the present invention may similarly be applicable if the peripheral device is a peripheral device other than a printing device. For example, the present invention is applicable to a multifunction device in which a scanner function or a facsimile function is included in the printing device 1. In this multifunction device, if the scanner function is included in the multifunction device, scanned image data and scan setting data are stored in the storage unit. In addition, if the multifunction device includes the facsimile function, a telephone directory of destinations (for each user or commonly used) and data of received facsimile documents are stored in the storage unit. The deletion is carried out by applying the classification of levels described above to the data.

In addition, although a case of using the USB memory 3 as the removable storage medium has been described as an example, it is needless to say that the present invention is applicable in a similar manner if the removable storage medium is other removable storage media including a memory card.

What is claimed is:

1. A peripheral device comprising:

a mounting portion that is configured to mount a removable storage medium;

a storage unit that is configured to store data;

a reading out unit that reads out first specific information and first identification information from the removable storage medium when the removable storage medium is mounted to the mounting portion, the first specific information representing a deletion authority level among a plurality of deletion authority levels, the first identification information uniquely identifying the removable storage medium;

a table storing unit that stores a table which registers second identification information and second specific information in relation to the second identification information, the second specific information indicating a deletion authority level among a plurality of deletion authority levels;

a deletion authority specifying unit that specifies a deletion authority for specifying authority to delete data based on the specific information read out by the reading out unit when the first identification information read from the removable storage medium is the same as the second identification information registered in the table by determining whether the deletion authority level indicated by the first specific information read out by the reading out unit is lower than or equal to the deletion authority level indicated by the second specific information registered in the table; and a permitting unit that permits deletion of data in the storage unit based on the deletion authority specified by the deletion authority specifying unit when the deletion authority specifying unit determines that the deletion authority level indicated by the first specific information read out by the reading out unit is lower than or equal to the deletion authority level indicated by the second specific information registered in the table; and a prohibiting unit that prohibits the deletion of data stored in the storage unit when the first identification information read from the removable storage medium is not the same as the second identification information registered in the table or when the deletion authority level indicated by the first specific information read out by the reading out unit is higher than the deletion authority level indicated by the second specific information registered in the table.

2. The peripheral device as claimed in claim 1, further comprising:
a data deletion unit that deletes at least part of data in the storage unit; and
a physical deletion unit that deletes a physical trace of data based on the first specific information read out by the reading out unit.

3. The peripheral device as claimed in claim 1, further comprising:
an image recording unit that records an image to a recording sheet;
a data deletion unit that deletes at least part of data in the storage unit; and
a physical deletion unit that deletes a physical trace of data of the image recording unit based on the first specific information read out by the reading out unit.

4. The peripheral device as claimed in claim 2, wherein the deletion authority specifying unit specifies a deletion authority level that designates the at least part of the data to be deleted.

5. The peripheral device as claimed in claim 4, wherein the data deletion unit and the physical deletion unit perform deletion depending on the deletion authority level.

6. The peripheral device as claimed in claim 2, wherein the deletion authority level includes a partially permitting level that designates a part of the data to be deleted, and a full permitting level that designates at least one of all of data and the physical trace to be deleted.

7. The peripheral device as claimed in claim 1, wherein the deletion authority includes at least two of a first level that designates a predetermined part of the data to be deleted, a second level that designates all of data to be deleted, a third level that designates both of all of the data and a physical trace of data to be deleted, and a fourth level that disable functions of the peripheral device.

8. The peripheral device as claimed in claim 1, wherein the first specific information includes a filename that shows a command to perform deletion, and
wherein the deletion authority specifying unit specifies the deletion authority based on the filename and the first identification information.

9. The peripheral device as claimed in claim 1, further comprising a backup unit that backs up the data to be deleted in the removable storage medium.

10. The peripheral device as claimed in claim 1, wherein the permitting unit permits the deletion of data by comparing the first specific information read out from the removable storage medium with second specific information that is registered in the table in relation to the second identification information.

11. A method for managing deletion of data in a peripheral device which includes a mounting portion that is configured to mount a removable storage medium, a storage unit that is configured to store data, and a table storing unit that stores a table which registers second identification information and second specific information in relation to the second identification information, the second specific information indicating a deletion authority level among a plurality of deletion authority levels, the method comprising:
reading out first specific information and first identification information from the removable storage medium when the removable storage medium is mounted to the mounting unit, the first specific information representing a deletion authority level among a plurality of deletion authority levels, the first identification information uniquely identifying the removable storage medium;
specifying a deletion authority for specifying authority to delete data based on the first specific information read out from the removable storage medium when the first identification information read from the removable storage medium is the same as the second identification information registered in the table by determining whether the deletion authority level indicated by the first specific information read out by the reading step is lower than or equal to the deletion authority level indicated by the second specific information registered in the table;
permitting deletion of data in the storage unit based on the specified deletion authority when the deletion authority specifying step determines that the deletion authority level indicated by the first specific information read out by the reading step is lower than or equal to the deletion authority level indicated by the second specific information registered in the table; and
prohibiting the deletion of data stored in the storage unit when the first identification information read from the removable storage medium is not the same as the second identification information registered in the table or when the deletion authority level indicated by the first specific information read out by the reading out step is higher than the deletion authority level indicated by the second specific information registered in the table.

12. The method as claimed in claim 11, further comprising:
a first deleting step for deleting data in the storage unit based on the first specific information read out from a removable storage medium; and
a second deleting step for deleting a physical trace of data based on the first specific information read out from the removable storage medium.

13. The method as claimed in claim 11, wherein the peripheral device includes an image recording unit that records an image to a recording sheet, the method further comprising:
a first deleting step for deleting data in the storage unit based on the first specific information read out from a removable storage medium; and
a second deleting step for deleting a physical trace of data of the image recording unit based on the first specific information read out from the removable storage medium.

14. The method as claimed in claim 11, wherein the specifying step includes specifying a deletion authority level that designates the at least part of the data to be deleted.

15. The method as claimed claim 14, wherein at least one of the first deleting step and the second deleting step includes performing deletion depending on the deletion authority level.

16. The method as claimed in claim 11, wherein the deletion authority specifying step includes specifying a partially permitting level that designates a part of the data to be deleted, and a full permitting level that designates at least one of all of the data and the physical trace to be deleted.

17. The method as claimed in claim 11, wherein the deletion authority includes at least two of a first level that designates a predetermined part of the data to be deleted, a second level that designates all of the data to be deleted, a third level that designates both of all of the data and a physical trace of data to be deleted, and a fourth level that disables functions of the peripheral device.

18. The method as claimed in claim 11, wherein the first specific information includes a filename that shows a command to perform deletion; and wherein the deletion authority specifying step includes specifying the deletion authority based on the filename and the first identification information.

19. The method as claimed in claim 11, further comprising backing up data to be deleted in the removable storage medium.

20. The method as claimed in claim 11, wherein the permitting step includes comparing the first specific information read out from the storage medium with second specific information that is registered in the table in relation to the second identification information.

* * * * *